Aug. 12, 1930.　　　　J. C. KING　　　　1,773,044
DEVICE FOR COALING VESSELS
Filed March 24, 1926　　10 Sheets-Sheet 1

John C. King
INVENTOR
BY Victor J. Evans
ATTORNEY

WITNESS:

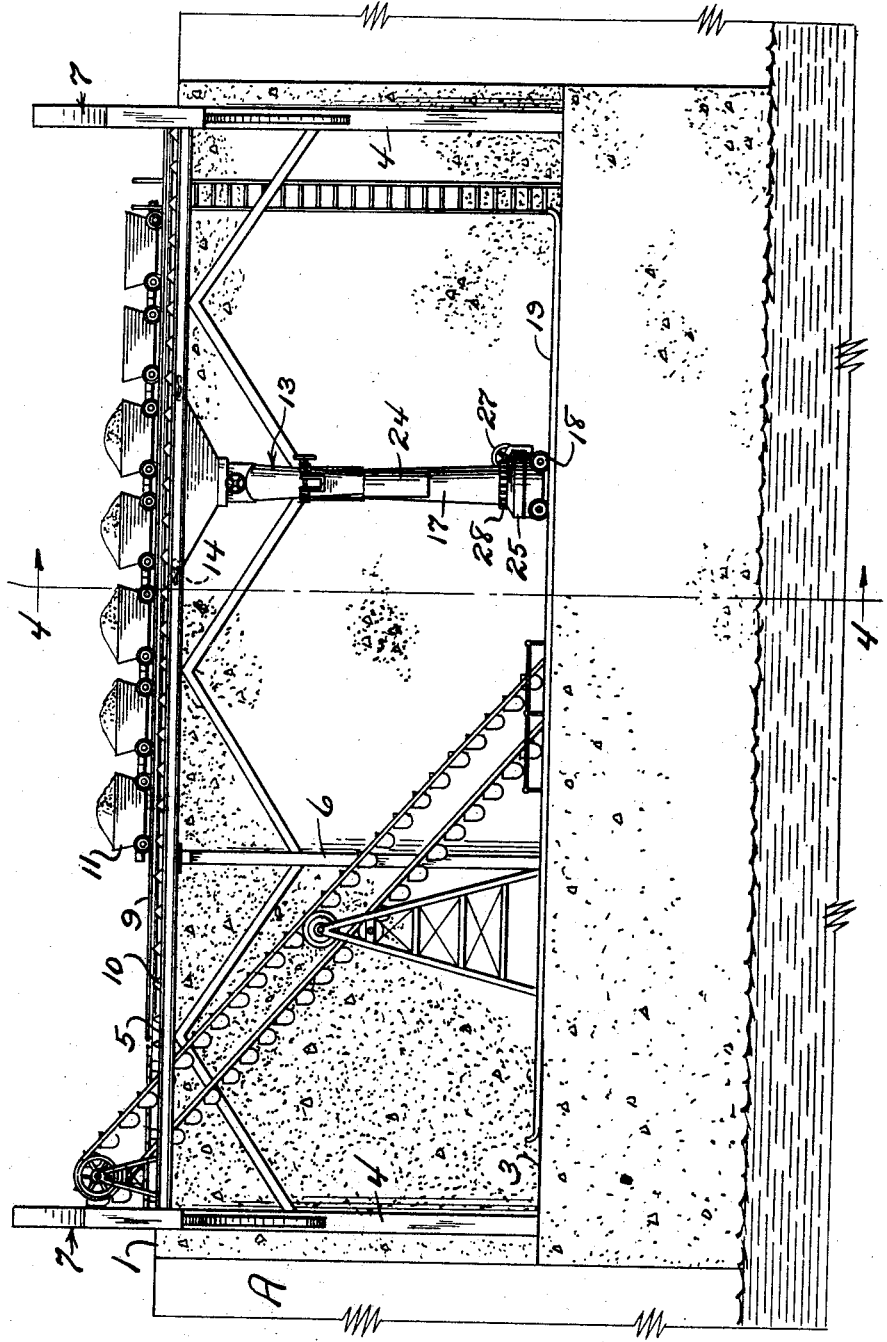

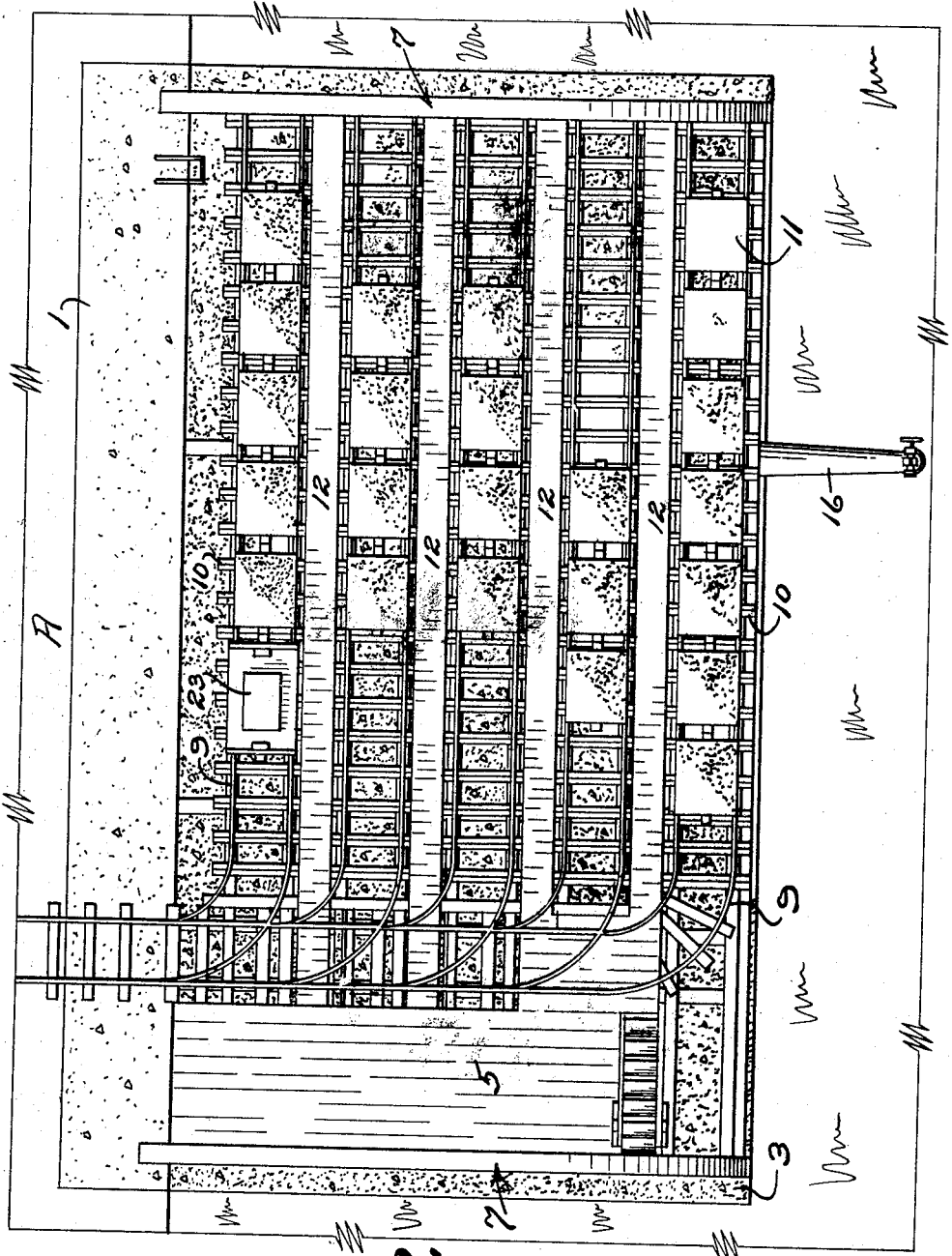

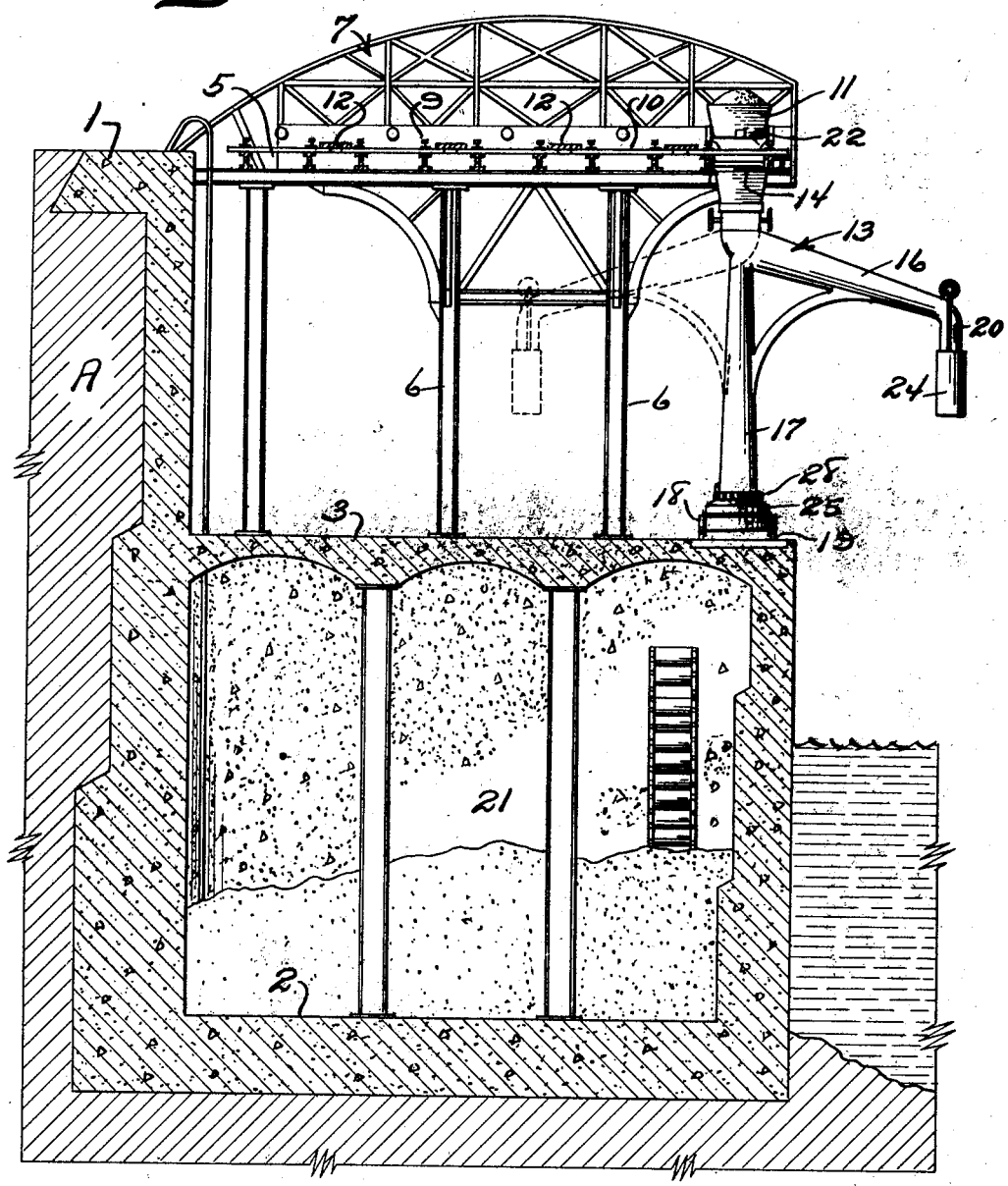

Aug. 12, 1930.                J. C. KING                1,773,044
                        DEVICE FOR COALING VESSELS
                Filed March 24, 1926        10 Sheets-Sheet 5
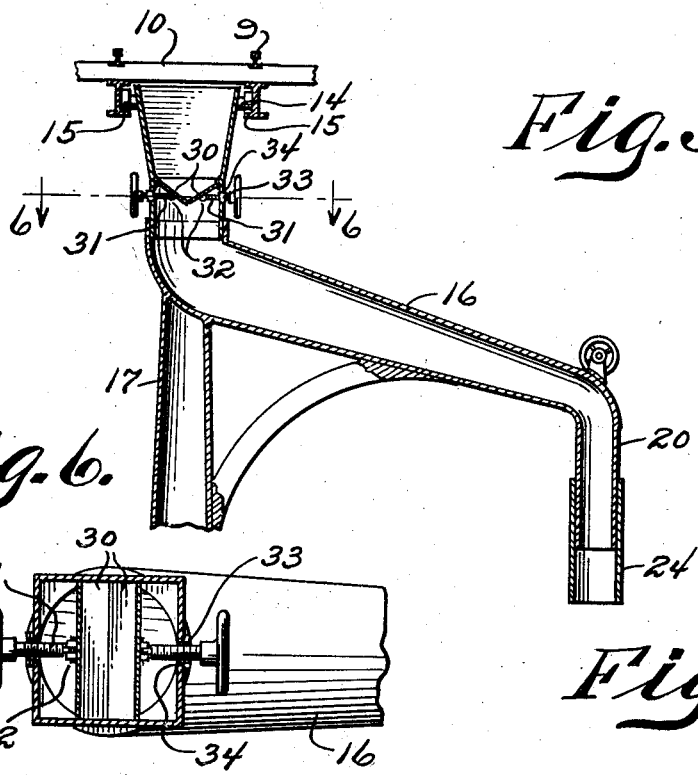
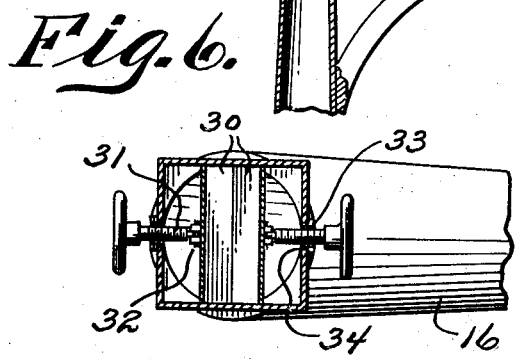
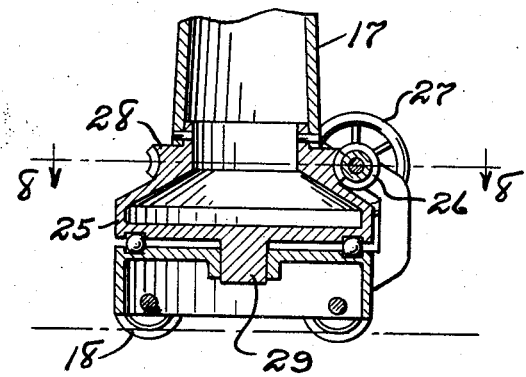
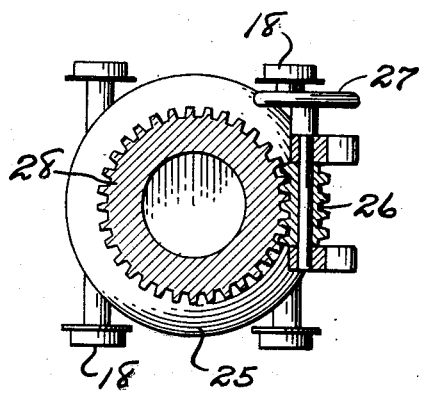
John C. King, INVENTOR
BY Victor J. Evans
                    ATTORNEY
WITNESS:

Aug. 12, 1930.  J. C. KING  1,773,044
DEVICE FOR COALING VESSELS
Filed March 24, 1926    10 Sheets-Sheet 6

John C. King
INVENTOR

BY Victor J. Evans
ATTORNEY

WITNESS: John Donovan

Aug. 12, 1930.  J. C. KING  1,773,044
DEVICE FOR COALING VESSELS
Filed March 24, 1926   10 Sheets-Sheet 9

John C. King INVENTOR
BY Victor J. Evans
ATTORNEY

WITNESS:

Aug. 12, 1930.                J. C. KING                1,773,044
                        DEVICE FOR COALING VESSELS
                  Filed March 24, 1926      10 Sheets-Sheet 10
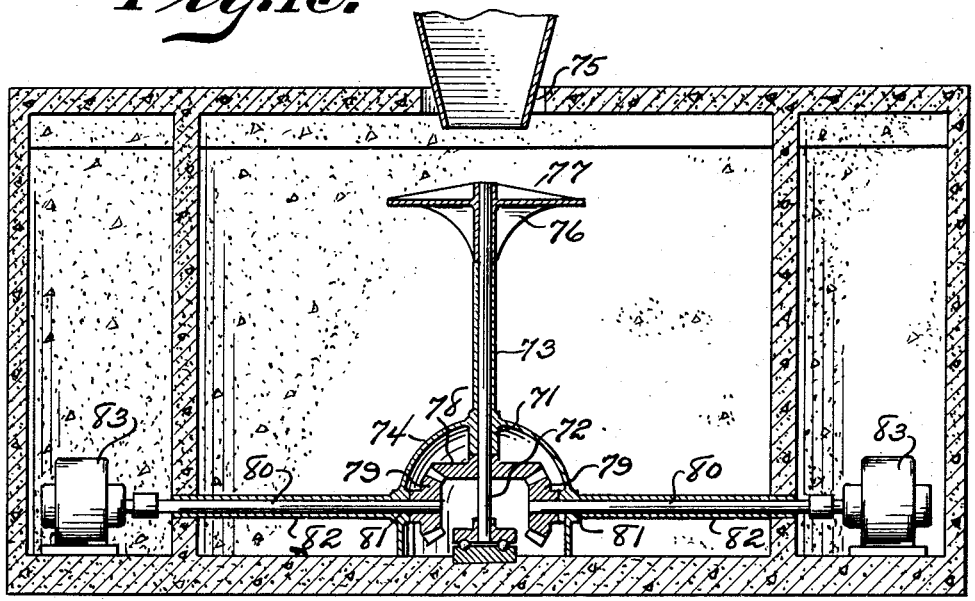
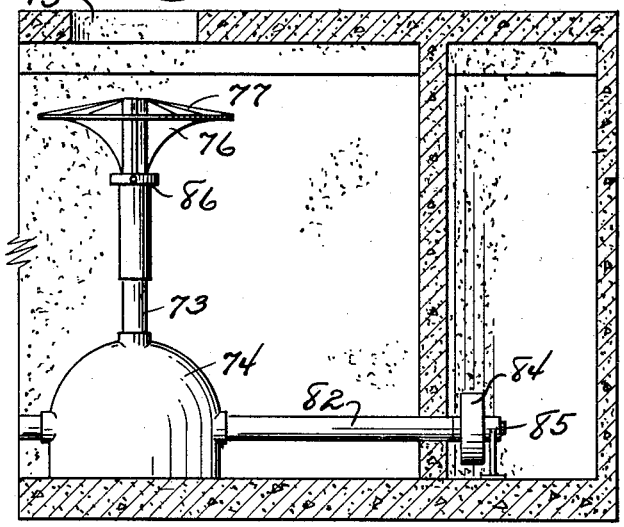
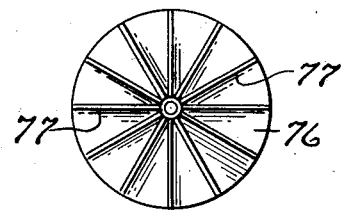
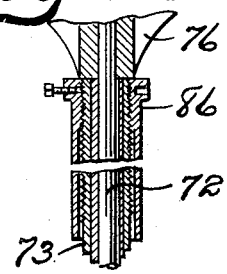
John C. King INVENTOR
BY Victor J. Evans ATTORNEY
WITNESS:

Patented Aug. 12, 1930

1,773,044

UNITED STATES PATENT OFFICE

JOHN CHARLIE KING, OF DALBY, AUSTRALIA

DEVICE FOR COALING VESSELS

Application filed March 24, 1926. Serial No. 97,060.

This invention relates to loading apparatus and has for its object the provision of a device which will greatly facilitate the coaling of vessels of all kind, storage, unloading and chute means being provided whereby the coal may be discharged directly into the bunkers of a vessel by the simple process of dumping the coal trucks or cars which are brought along in train formation onto the supporting platform of the device.

An important and more specific object is the provision of a device of this character which embodies a reinforced concrete base construction which constitutes the foundation and upon which are mounted the structural steel elements which go to make up the superstructure.

A more particular object is the provision of a movable chute which may be moved along from place to place wherever the discharging of the cars is being accomplished and to bring the outlet spout into proper position to discharge into the bunkers of a ship.

Another object is the provision of novel means for regulating or cutting off the flow of coal from the discharge chute, the control being effected by simple manually operable means.

Yet another object is the provision of a loading device of this character which may be built out from banks of any height and which may be equipped with a plurality of track-ways so that the work of coaling may be carried on with the utmost speed.

A further object is the provision of novel coal trimming means which will scatter or distribute the coal into the bins so that the filling thereof will be uniform.

The invention additionally contemplates the provision of various modifications and alterations in specific details for carrying out the broad idea or purpose, all of which refinements operate to insure the maximum efficiency, speed, saving of labor and the like.

With the above and other objects and advantages in view the invention consists in the details of construction to be hereinafter more fully described and claimed and illustrated in the accompanying drawings, in which:

Figure 2 is an elevation at right angles to Figure 1,

Figure 3 is a top plan view,

Figure 4 is an elevation looking at Figure 2 from the left side,

Figure 1:
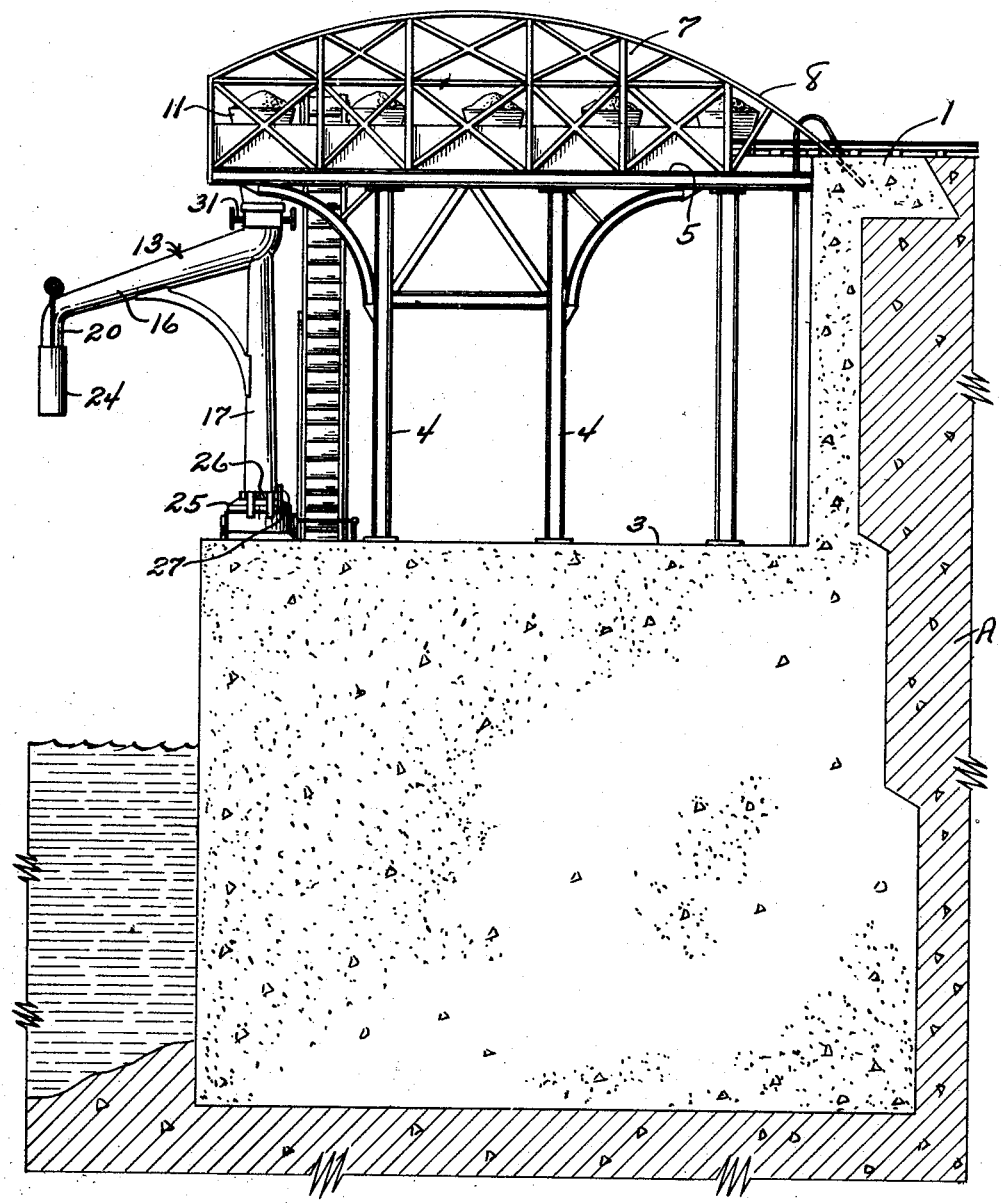
Figure 1 is a side elevation of the device showing one form thereof.
Figure 9:
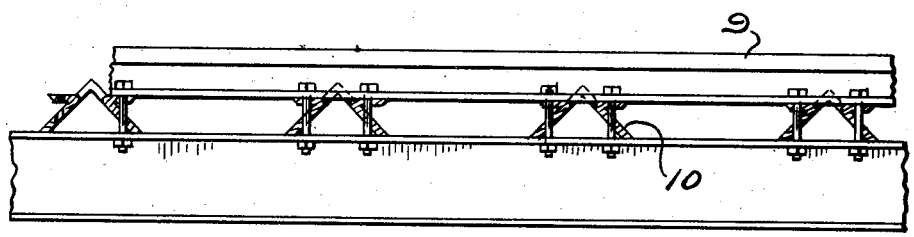
Figure 10:
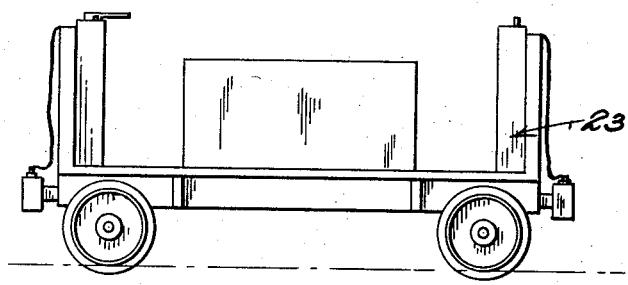
Figure 11:
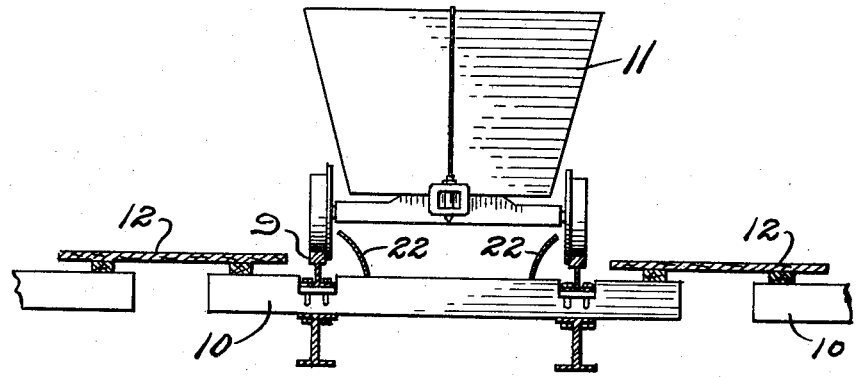
Figure 12:
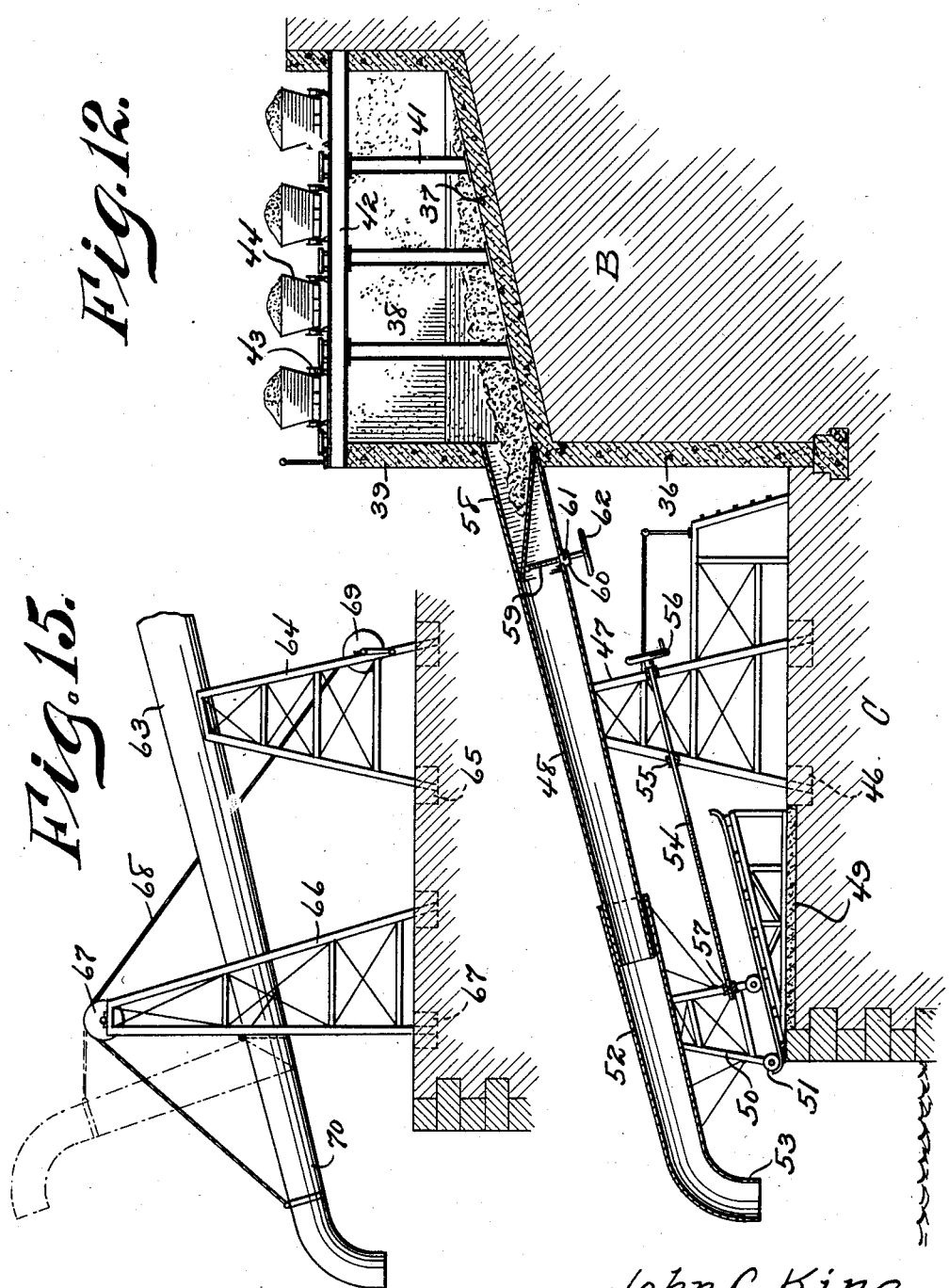
Figure 13:
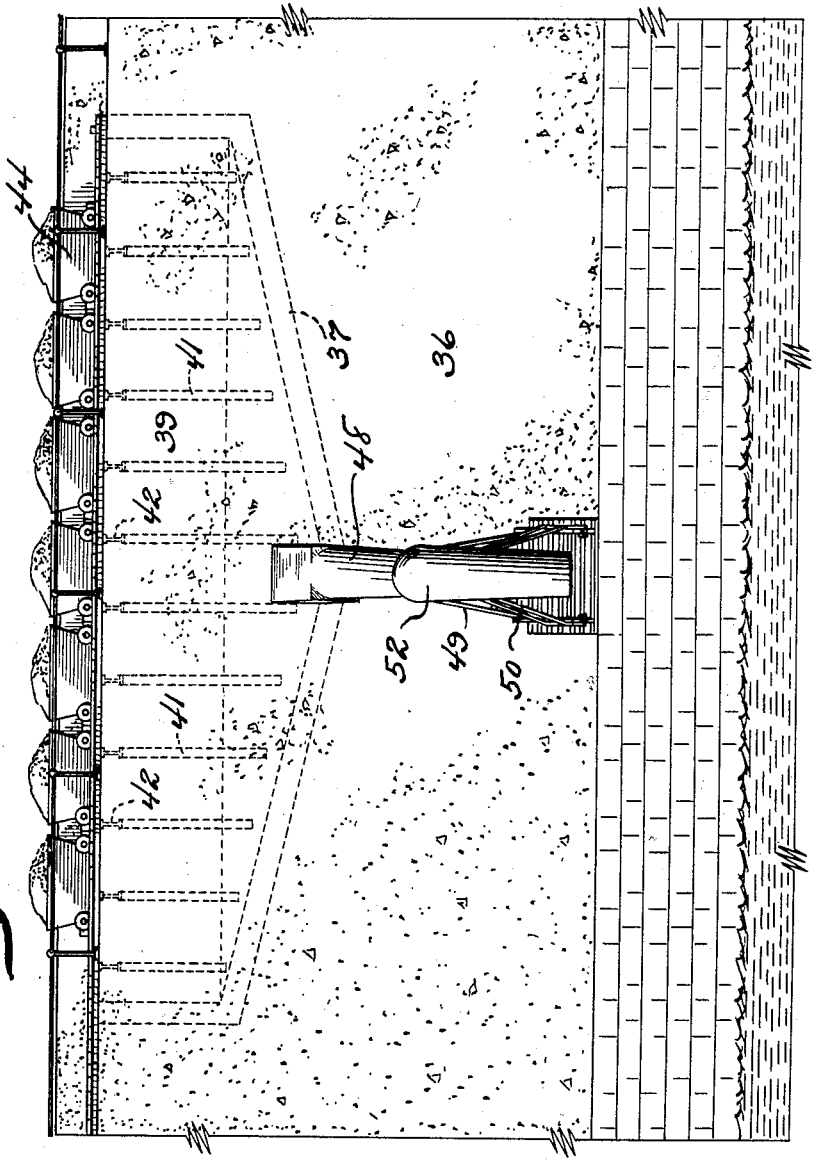
Figure 14:
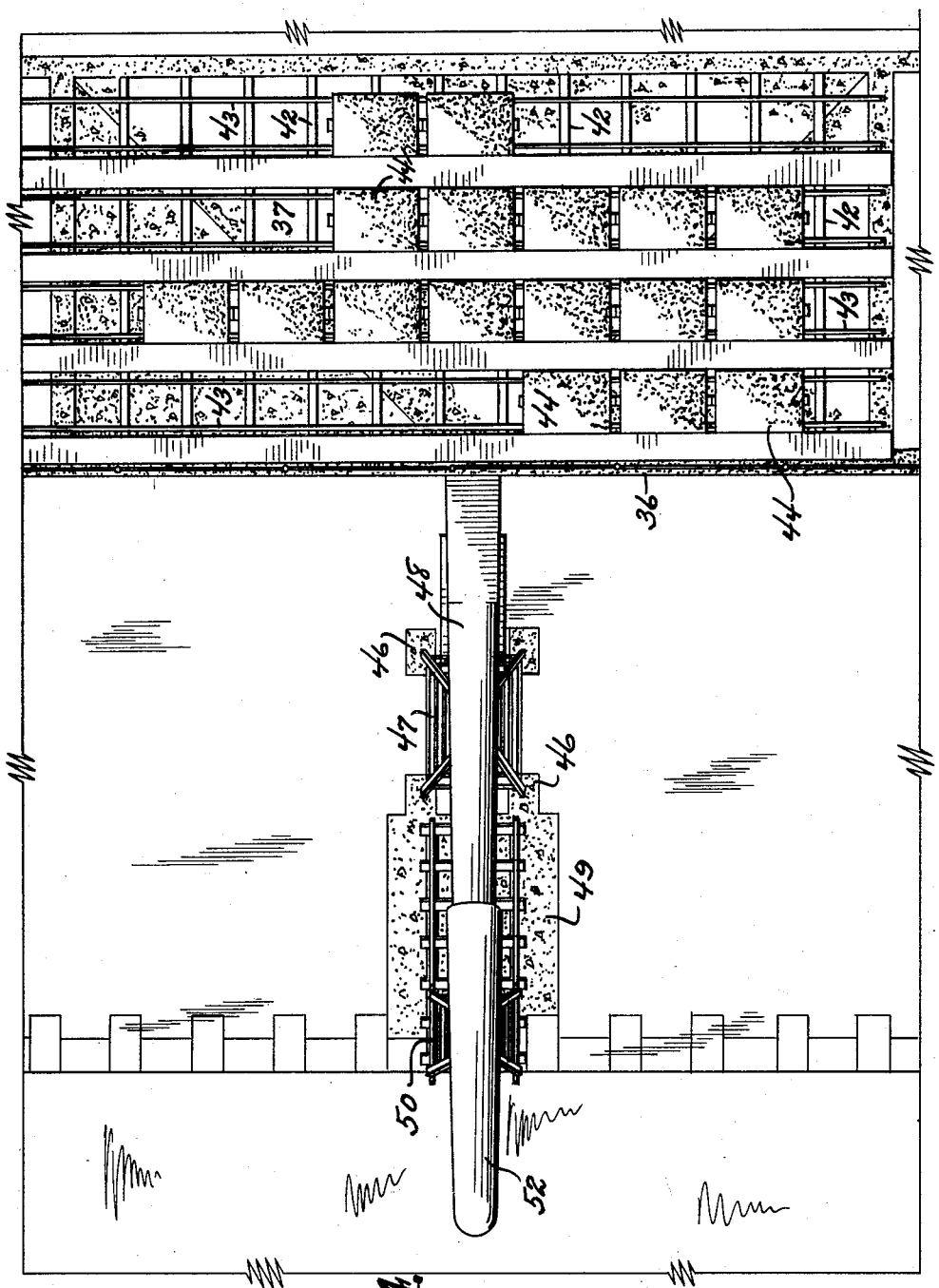

Figure 5 is a detail vertical section through the discharge chute illustrating the regulating means, Figure 6 is a horizontal section therethrough, Figure 7 is a detail longitudinal section through one of the discharge chute supports showing the swivel mounting for the wheels, Figure 8 is a cross section therethrough, Figure 9 is a detail section showing the ties used in the track-way, Figure 10 is a side elevation of the type of power car I prefer to use, Figure 11 is a detail view of the track-way showing the safety walks and showing a view of one of the trucks, Figure 12 is a longitudinal section through another form of the invention, Figure 13 is an elevation thereof looking at it from the water side, Figure 14 is a plan view, Figure 15 is a fragmentary view similar to Figure 12 showing a slight modification, Figure 16 is a vertical section through a coal pit showing the trimming mechanism, Figure 17 is a plan view of the distributor wheel, Figure 18 is a view similar to Figure 16 showing a different drive mechanism, Figure 19 is a detail view of the adjustable feature in Figure 18.

Referring more particularly to the drawings, and especially Figures 1 to 11 inclusive, the letter A designates the bank of the stream or body of water above which my coaling device is built. Embedded at the top and bottom of the bank and in the bottom of the body of water are reinforced concrete foundations 1, 2 and 3 of any suitable size and of any specific construction for supporting the superstructure which includes steel supports 4 of any desired number carrying a platform 5 and of arch like construction so as to possess maximum strength and durability. Embedded in the foundation element 2 is an upright steel pillar 6 which likewise supports the platform. Above the platform is a truss like girder structure 7 which insures rigidity. For reinforcing purposes, I provide a stay 8 connected with the girder and embedded within the foundation 1. The above describes only one unit of the structural steel work and it is obvious that any desired number of units may be provided depending upon the intended size of the platform or the coaling capacity of the entire apparatus.

The platform 5 supports any desired number of tracks 9 which are preferably laid on cross ties 10 which are triangular in cross section with their sharp edges uppermost to prevent the accumulation of coal thereon. These tracks are designed to have traveled thereover the trains of coal trucks or cars 11 to be described more in detail hereinafter. The track construction is such as to provide walks 12 for the necessary operators, these walks being located as to safe guard the operators during the performance of their duties.

At the edge of the platform most remote from the bank A I provide one or more chutes designated broadly by the numeral 13 which have their upper ends open and disposed below the tracks 9 so that the trucks 11 may have their contents dumped into the chutes. These chutes might be stationarily mounted, though in actual practice I prefer to equip them with carriages 14 rolling along guides 15 supported by the platform. The chutes have their bottoms inclined downwardly from the ends toward the center and terminate in downwardly inclined discharge extensions 16 supported by tubular members 17 equipped with swiveled wheels 18 which roll along suitable tracks or guides 19 on the foundation member 3. The extensions 16 are inclined away from the platform so as to be capable of discharging into vessels moored beside the platform. The ends of the extension 16 are downturned as indicated at 20 to insure the vertical discharge of coal and are equipped with adjustable or controllable discharge spout mechanism to be described.

Beneath the platform is built a storage bin 21 for a reserve supply of coal, which coal may be withdrawn when needed by any suitable scoop or other hoisting mechanism and dumped into the discharge chutes. It is likewise true that I may provide various accessories on the platform suitably mounted with respect thereto for the purpose of facilitating handling of the coal. However it is believed to be unnecessary to explain all of these details though it might be well to mention that the above described walks are arranged at each side of the tracks and that between the walks are guides or deflectors 22 which are curved and which serve to conduct or guide the coal into the chutes and prevent it from scattering when the trucks 11 are dumped.

While it is true that any desired hauling device may be used for moving trains along the tracks, it is preferable to employ an electric locomotive such as that illustrated at 23, which may be hitched to the front or rear of a train of trucks for pushing or pulling them as may be found preferable. The advantage of such a locomotive is its compactness.

Associated with the discharge ends 20 of the chutes are spouts 24 telescopically engaged thereon so as to be capable of being raised or lowered depending upon the height of the vessel to be coaled, it being desirable not to leave an excessive space between the end of the spout and the hatch through which the coal is loaded. For effecting adjustment of the spout, any screw or gear mechanism suitable for the purpose may be provided. It is also of advantage at times to swing these spouts into inoperative position, and for carrying out this feature I provide a pivotal mounting 25 for the spout, and a worm 26 having a hand wheel 27 and engaging a rack 28 pivoted at 29 on the spout. One of the detail figures shows the spout as swung into inoperative position, which position is illustrated by dotted lines.

For controlling the discharge of coal through the spout, I provide a pair of plates 30 hinged at opposite sides therein and adapted to be held at any desired distance apart for regulating the discharge opening. The control means comprises a pair of threaded rods 31 which pass through opposite sides of the spout and which are swivelly connected at 32 with the plates. These rods are engaged through nuts 33 pivoted in openings 34 in the sides of the spout, this detail construction being provided to permit the unavoidable swinging of the screws.

In the use of the above described mechanism it will be seen that the trains of trucks pushed or pulled onto the platform and along the tracks may be readily dumped into the chutes or chute if only one is provided. The coal falling into the chute at any point will slide along the bottom thereof to the center and will pass out through the extension 16, end 20 and spout 24 into the vessel to be coaled. The rate of discharge or the cutting off of the discharge may be controlled by operating the screws 31. If the chutes are equipped with the carriages 14 traveling on the guides 15, it is obvious that the chutes may be moved along the edge of the platform to bring the spouts in proper position to discharge into vessels instead of moving the vessels to bring their coaling hatches beneath the spout. By making the extensions 16 of telescopic sections, it is apparent that they may be extended or retracted to come directly above the hatches.

In Figures 12 to 14 I have shown a modified form of the invention in which the structure is adapted to be built upon a sloping bank B.

In this form I provide a wall 36 against the bank extending from the wall back from the bank in an upwardly inclined direction, the bottom 37 of a storage bin 38 having a reinforced wall 39 formed as a continuation or extension of the wall 36 and formed with an opening 40. Rising from the floor or bottom 37 are steel uprights 41 which, together with the walls of the bin support girders 42 carrying tracks 43 for the trains of trucks 44 which correspond to the trucks 11. The same triangular tie construction, deflectors and safety walks are provided as in the first described form and any suitable guard rail may be provided at the top of the wall 39 for the safety of the operators.

In the ground C, are reinforced concrete foundations 46 for a scaffold structure 47 which supports the stationary rear portion 48 of a discharge chute which leads from the opening 40 in the front wall of the bin. Beyond the outermost foundation 46 is a reinforced concrete flooring 49 on which is mounted a scaffold structure 50 equipped with rollers 51 whereby it may be moved toward or from the sea wall 36. Carried by the scaffold 50 is the outermost section 52 of the chute, which section telescopes upon the section 48. The outer end of the section 52 is downturned as indicated at 53 to define a discharge spout.

For adjusting the length of the chute, I provide means for moving the scaffold 50 along the floor 49. To carry out this feature I employ an elongated rod 54 journaled through suitable bearings 55 on the scaffold 47 and equipped at one end with a hand wheel 56. This rod is threaded and passes through suitable nut members 57 in the or on the scaffold 50 so that when the hand wheel 56 is turned the scaffold 50 carrying the extensible chute section will be moved in one direction or the other to extend or retract the chute.

At the point where the chute section 48 connects with the bin, I provide a discharge control means which includes a pivoted plate 58 with the free end of which is swivelly connected one end of a screw 59 which passes through a nut member 60 pivoted within an opening 61 in the bottom of the chute. The screw carries a hand wheel 62 for effecting turning movement to regulate the position of the plate 58 and consequently control the rate of discharge of the coal through the chute.

In Figure 15 I have shown a slightly different arrangement in which the chute 63 is supported upon a fixed scaffold 64 embedded in foundations 65, corresponding to the scaffold 47 and further supported by a second fixed scaffold 66 mounted on foundations 67. The scaffold 66 replaces the movable scaffold 50 shown in Figures 12, 13 and 14 and carries a guide pulley 67 over which is trained a cable 68 which has one end secured to and wrapped about a windlass 69. The chute has a hinged end section 70 to which the other end of the cable is attached. By winding up the cable it is evident that the movable end section of the chute may be swung up into the dotted line position shown in Figure 15.

In Figures 16 and 17 I have shown a coal trimming or distributing device for use in the pits whereby the coal will be thrown against the walls thereof to insure uniform falling. In carrying out this feature of the invention I provide a bearing 71 located in the bottom of a coal pit P, which bearing supports a vertical shaft 72 surrounded by a housing 73 formed as a continuation of a housing 74 which extends over and considerably beyond the bearing 71 for a purpose to be described. The pit has a coal opening 75 through which coal is discharged from the chutes above described.

Mounted on the upper end of the shaft 72 is a wheel 76 having blades or vanes 77 which will catch the coal and throw it outwardly by centrifugal force as the wheel is rotated. On the lower portion of the shaft and within the housing 74 is a bevel gear 78 which meshes with two bevel pinions 79 on the inner ends of shafts 80 which are horizontally arranged and which are journaled through bearings 81 and housings 82.

The bearings 81 are located within the housing 74 and this housing is for the purpose of excluding coal dust from the transmission mechanism and also preventing injury thereto on account of pressure. The housings 82 and 73 are for the same purpose. Mounted outside of the bin or pit are motors 83 which drive the shafts 80.

In the operation it will be seen that as the coal enters through the hole 75, it will fall upon the rapidly rotating wheel 76 and will be thrown more or less violently outwardly against the walls thereof so that the corners and outermost portions of the bin or pit will be filled as completely and compactly as any other portion.

In Figure 18 I have shown a slight modification in which the above described gearing is used but the motors replaced by pulleys 84 which are mounted on shafts 85 corresponding to the shafts 80, which pulleys are driven by any suitable countershaft operated by electric motors or by an engine of any preferred variety. The operation is of course the same in this form as in the above described form except that it is preferable to provide an adjustable means indicated at 86 for varying the height of the distributing wheel 76 as the bin or pit is filled.

From the foregoing description and a study of the drawings it will be apparent that I have thus provided a comparatively simple and easily operated and controlled mechanism which will effect a manifest saving of time, waste and labor in the coaling of vessels of all kinds. Ample provision has been made for taking care of every contingency which can be foreseen and it is consequently believed that the device is bound to operate in a highly satisfactory manner and perform its functions in such a way as to recommend itself to all having occasion to employ its services.

While I have shown and described the preferred embodiment of my invention it is of course to be understood that I reserve the right to make such changes in the form, construction and arrangement of parts as will not depart from the spirit of the invention or the scope of the subjoined claims.

Having thus described my invention I claim:

1. In a vessel coaling device, a discharge chute, tracks adapted to have trains of dump cars movable therealong, the tracks including ties of inverted V-shape in cross section, and guide plates mounted on said ties and located inwardly of the track in longitudinal relation thereto.

2. In a vessel coaling device, a bin structure, foundation means and structural steel support means for the bin structure, a discharge chute leading from the bin structure, tracks mounted above the bin structure and adapted to have trains of dump cars movable therealong, walks arranged beside the tracks for the safety of operators, and guide plates extending longitudinally of the tracks inwardly of said walks, said guide plates being curved for conducting coal to the bin structure.

3. In a vessel coaling device, a foundation structure embedded in the earth, a superstructure mounted upon said foundation, a bin structure below the superstructure having an inclined bottom, tracks above the bin structure for the passage of dump cars whereby the bin may be filled, a telescopically adjustable discharge chute leading from the bin, means for supporting the chute, and adjustable means within the chute controlling passage therethrough.

4. In a vessel coaling device, I-beams, a plurality of tie members of inverted V-shape in cross section mounted upon said I-beams and formed with spaced recesses, rails mounted upon said tie members and located within said recesses, securing elements passing through the rails, through said tie members and the upper flange of the I-beams, and curved deflector plates mounted upon said tie members inwardly of said rails and curving outwardly and upwardly with respect thereto.

5. In a vessel coaling device, I-beams, a plurality of tie members of inverted V-shape in cross section mounted upon said I-beams and formed with spaced recesses, rails mounted upon said tie members and located within said recesses, securing elements passing through the rails, through said tie members and the upper flange of the I-beams, curved deflector plates mounted upon said tie members inwardly of said rails and curving outwardly and upwardly with respect thereto, said tie members being arranged in groups above the top of the bin with the ends of adjacent ones spaced apart, and walk structures mounted upon said tie members and bridging the spaces between the ends of the adjacent ones.

In testimony whereof I affix my signature.

JOHN CHARLIE KING.